United States Patent Office 3,118,769
Patented Jan. 21, 1964

3,118,769
PREPARATION OF FLAVORED DAIRY PRODUCTS
John W. Pletcher, Niles, Mich., assignor to CBA Incorporated, a corporation of Michigan
No Drawing. Filed Sept. 13, 1961, Ser. No. 137,742
7 Claims. (Cl. 99—54)

This invention relates to the preparation of flavored dairy products, including whole milk, skim milk, buttermilk, powdered milk and cottage cheese.

Prior to the present invention, many attempts have been made to prepare flavored milk drinks which will maintain homogeneity over extended periods of time and be otherwise satisfactory and attractive for sale to the consuming public. Various processes have been proposed, some of which include the use of additives such as Irish moss or colloidal substances, but to the best of my knowledge no such prior process has achieved any significant commercial success with any flavors other than chocolate. Prior to the present invention, most flavored milk drinks have had to be mixed shortly prior to consumption because the flavoring separates out after a short time.

An object of the present invention is to provide a process for preparing a milk drink of any desired flavor in which the drink will retain its flavor indefinitely without the flavoring separating out from the milk.

A further object of the invention is to provide a process for successfully flavoring cottage cheese with any desired flavor.

Another object is to provide a process for preparing powdered milk having any desired flavor.

I have discovered that it is possible to prepare a flavored milk drink which will remain homogeneous for an extended period utilizing familiar and readily available ingredients provided such ingredients are utilized in the proper proportions and according to a certain process. In carrying out this process to flavor whole milk, utilizing what at present seems to be the optimum proportions of ingredients, I add to 8 parts by volume of homogenized milk containing 3½% or less butterfat, 1 part by volume of a syrup which has been prepared previously by combining the following ingredients, all parts of the syrup being stated by weight: 1 part of liquid flavoring, approximately 93 parts of sugar, and approximately 133 parts of water. However, the invention is not limited to this particular formulation and adaptation for as disclosed in detail hereinafter it is possible to vary the proportions of the ingredients considerably while still achieving the advantages of this invention for whole milk and other dairy products.

In practice, flavored diary products have been prepared successfully by the following procedures which are given by way of example. The first example utilizes the optimum proportions just stated in preparing the syrup although in such first example the amounts given are according to the manner in which they were actually measured, 2 of which were by volume, instead of by weight.

*Example I*

Fresh milk was first clarified and standardized in the normal manner during which procedures the butterfat was first removed and then a portion of it was restored to the milk. In this instance the resulting whole milk contained 2% butterfat by weight. A syrup was prepared by mixing into 40 fluid oz. of water, 28 oz. avoirdupois of sugar and 9 cc. of imitation pineapple flavoring manufactured by R. D. Webb & Company, Inc., of Linden, New Jersey. Then the syrup was mixed into the milk in the ratio of one part of syrup by volume to 8 parts of milk by volume, and thereafter the flavored milk was pasteurized at 160° Fahrenheit for 30 minutes and then cooled to 140°, homogenized at 2250 lbs. per sq. in. in a Manton Gaulin homogenizer, cooled to 40° F. by instant cooling (plate cooled in 4 to 12 minutes), and packaged in government approved and inspected containers. This flavored milk drink was held at 34° F. refrigeration for 5 weeks without any noticeable loss of flavor, separation of the flavoring from the milk, coagulation, any indication of souring, or any other indication of deterioration. At the end of the 5 week period it remained a very tasty beverage.

*Example II*

The same procedure was followed as in Example I except that the syrup was sterilized separately and then was added to the milk immediately prior to packaging and after pasteurization, homogenization and cooling of the milk, instead of before these operations as in Example I. The results were equally successful as with Example I; the flavored milk drink was held for 5 weeks under refrigeration without any noticeable loss of flavor, separation of the flavoring from the milk, coagulation, any indication of souring, or any other indication of deterioration.

*Example III*

The following R. D. Webb & Company liquid flavorings were used in a variety of tests: imitation greengage grape concentrated, soluble lemon lime flavor #8202, imitation pineapple flavor #6552, imitation vanilla flavor 5 fold #5619M, imitation strawberry flavor #5751, imitation sweet cherry #6401, quintessence of orange peel, pure pineapple base, pure strawberry flavor, imitation vanilla custard concentrated, and pure sweet cherry with pit flavor. These flavors were used individually in preparing syrups using the same proportions as specified in Example I. In addition, in some cases certified food coloring was added to the syrup. Then the various syrups were added to milk in individual tests in the ratio of 1 part by volume of syrup to 8 parts by volume of milk; the milk used in these tests ranged from skim milk to milk having 3½% butterfat content. In some cases the syrup was added prior to pasteurization, homogenization and cooling as in Example I while in other cases the syrup was sterilized separately and was added to the milk after the pasteurization, homogenization and cooling operations had been performed as in Example II. In every case the resulting flavored milk drink was entirely satisfactory and maintained its desirable characteristics for an extended period of at least 4 weeks under refrigeration.

*Example IV*

Other tests were made utilizing syrups prepared with pure pineapple extract (12% alcohol), pure lemon extract (84% alcohol), and pure orange extract (84% alcohol) in a mixture of water, sugar and certified food coloring; the flavoring, water and sugar were mixed in the same proportions as specified in Example I. These syrups then were added to milk in the ratio of 1 part syrup by volume to 8 parts of milk by volume. When the syrups were added before the milk was pasteurized, the pasteurization process seemed to cause a loss in flavor in certain cases, apparently due to the evaporation of the alcohol and flavoring, although in some cases the results were satisfactory. However, by adding cold sterile syrup to cold, clarified, standardized, pasteurized, homogenized milk a very tasteful flavored milk drink was obtained in every case which maintained its homogeneity and other desirable characteristics for extended periods of at least 4 weeks.

*Example V*

A large number of other tests were made in which syrups were prepared having from 23 to 2181 parts by weight of sugar and from 13 to 909 parts by weight of water for each 1 part by weight of essence or flavoring. Such syrups were then added to milk ranging from skim milk to 3½% butterfat content in a variety of ratios ranging from 2 parts of milk to 1 part of syrup to 12 parts of milk to 1 part of syrup, all measured by volume. The intensity of the flavor varied as the proportion of flavoring was increased and decreased and of course the sweetness also varied with the amount of sugar used. However, in all of these tests a satisfactory flavored milk drink was produced which did not separate, lose flavor or otherwise deteriorate when kept under refrigeration for periods of approximately 4 weeks.

*Example VI*

Fresh milk was clarified and standardized to provide whole milk containing 2% butterfat by weight. A syrup was prepared by mixing 1 part by weight of strawberry flavoring with approximately 93 parts by weight of sugar and approximately 133 parts by weight of water. Then the syrup was mixed into the milk in the ratio of 1 part of syrup by volume to 8 parts of milk by volume, to make approximately 5 gallons of flavored milk. Thereafter the flavored milk was pasteurized and homogenized. Then the 5 gallons of liquid was dried in a conventional milk dryer and the result was a powder equal to about 9% by weight of the original weight of the 5 gallons of liquid. When this powder was reconstituted by adding approximately 10 parts of water to 1 part of powder the result was a palatable beverage having a slight cooked taste, particularly with the initial sip, but nevertheless a satisfactory beverage. A portion of such reconstituted beverage was kept satisfactorily for 3 weeks under refrigeration.

*Example VII*

Buttermilk was prepared by heating 1 gallon of unpasteurized skim milk to 200° F. and maintaining such temperature for 1 hour, cooling it to 72° F. after the 1 hour, adding 2 ounces of buttermilk culture, and letting it stand for 14 hours and 15 minutes. 2 syrups were prepared, one cherry and the other lemon-lime, by using the same amounts as Example I, namely, 40 fluid ounces of water, 28 ounces avoirdupois of sugar and 9 cc. of flavoring. The 2 syrups were added to separate portions of the buttermilk in the same proportions as in Example I, that is, the ratio of 1 part by volume of syrup to 8 parts by volume of buttermilk. Other samples of buttermilk were made in the same manner except that the syrup was added to the unpasteurized skim milk before the heating step; the only other difference was that 2.2 ounces of culture was used instead of 2 ounces to accommodate the additional volume caused by the addition of the syrup. The sugar in the syrup seemed not to affect the action of the culture on the milk and a satisfactory flavored buttermilk was produced in approximately the same time as without the syrup. Tests of adding the syrup before the heating and other steps in preparing the buttermilk were carried out with both the cherry and the lemon-lime syrup. All of the buttermilk samples discussed heretofore kept at least 11 days under refrigeration without deterioration of any kind. Also, buttermilk was purchased from a retail store and the same cherry syrup prepared as set forth previously under this example was added in the same proportions of 1 part of syrup to 8 parts of buttermilk. This flavored beverage was kept under refrigeration for at least 18 days satisfactorily. All of the tests described with buttermilk provided a very satisfactory and tasty flavored buttermilk beverage. When the buttermilk stood for awhile the whey separated out in every case as normally happens with buttermilk but it appeared that the flavoring was homogeneous in the rest of the beverage. This was determined by pouring off the whey from certain samples and then drinking the remaining beverage. However, it was entirely satisfactory to shake up the beverage and recombine the whey with the remainder in the normal manner. Coloring was added in some of the buttermilk tests but it was found that with buttermilk the coloring did not remain uniformly in the beverage. Instead it came to the top with the whey and it was lost, that is, even though the whey was shaken up and recombined with the remainder of the liquid the color was not restored.

*Example VIII*

Cottage cheese was prepared by pasteurizing skim milk, cooling it to 70° F., adding 1% by weight of cottage cheese culture, heating the mixture at 120–130° F. for 2 to 3 hours, cooling the resulting basic ingredient and then adding to it a dressing composed of a mixture of butterfat and flavoring syrup. Both cherry and lemon-lime syrups were used individualy in the tests described under this example and the syrups were prepared in the same manner as set out under Example VII. In one test the dressing was prepared by combining 1 ounce of syrup and 1.7 ounces of 40% butterfat. The resulting dressing was then combined with 1 pound of the previously prepared basic ingredient just described to produce a flavored cottage cheese. Another test was made utilizing a dressing having 2 ounces of syrup and 1.8 ounces of 40% butterfat which dressing was combined with 1 pound of the basic ingredient. Another test was made utilizing a dressing composed of 3 ounces of syrup and 1.9 ounces of 40% butterfat which was likewise combined with 1 pound of the basic ingredient. All these amounts of syrup and butterfat are stated in ounces avoirdupois. It will be appreciated by those familiar with dairy products that it was necessary to utilize the amounts of butterfat indicated in order to achieve a cottage cheese product having at least 4% butterfat. All of the flavored cottage cheese produced in these tests was flavorful and entirely satisfactory as a food, and portions of it were kept under refrigeration for at least 18 days without any indication of deterioration or spoilage of any kind. Coloring was added in some of the cottage cheese tests and the results were entirely successful. The coloring mixed into the cottage cheese uniformly and remained satisfactorily.

Many flavoring materials or essences have carrying agents or solvents in addition to the material or materials which actually produce the flavor. In the tests described hereinbefore and in other tests flavoring materials were employed which had as solvents or carrying agents one or more of the following: propylene glycol, peanut oil, corn oil, other oils, alcohol and water. All of these were successful; however, the flavoring materials which had propylene glycol as at least one of the carrying agents appeared to be the best in that they provided a wholly uniform flavor throughout the milk or other dairy product. When flavorings with oil carrying agents were used it sometimes seemed that the flavoring was not distributed entirely uniformly throughout the milk or other dairy product. As mentioned previously, when alcohol is the carrying agent or one of the carrying agents it may be necessary to add the syrup after pasteurization instead of before pasteurization to obtain the best results for flavored milk. The tests included flavorings which were natural, artificial, imitation, imitation fortified, and combinations of these, and all were satisfactory. The following flavors have been tried successfully; these include the flavors mentioned in the specific examples set out hereinbefore.

(1) Pure sweet cherry with pit flavor
(2) Pure pineapple base
(3) Pure strawberry flavor
(4) Imitation vanilla custard concentrated
(5) Pure anise extract
(6) Pure orange flavor
(7) Pure brandy flavor
(8) Pure pineapple extract
(9) Imitation cocoanut flavoring
(10) Pure almond flavoring
(11) Pure peppermint extract
(12) Pure lemon extract
(13) Quintessence orange peel

(14) Imitation greengage grape flavor concentrated
(15) Soluble lemon-lime flavor #8202
(16) Imitation pineapple flavor #6552
(17) Imitation vanilla flavor, 5 fold, 5619M
(18) Non-alcoholic imitation minted chocolate flavor #8662
(19) Imitation strawberry flavor #5751
(20) Imitation sweet cherry #6401
(21) Imitation banana flavor
(22) Raspberry
(23) Non-alcoholic imitation chocolate fortifier #8603
(24) Plum Every flavoring tried was satisfactory from the standpoint of providing a milk drink or other dairy product which did not separate, lose flavor or otherwise deteriorate even though kept under refrigeration for an extended period.

It is essential to the carrying out of the present process that the ingredients which comprise the syrup be mixed together before the syrup is mixed with the milk or other dairy product. If the ingredients of the syrup are added directly to a dairy product without pre-mixing, the benefits of this invention will not be achieved; in such circumstances the flavoring and artificial coloring, if any, will separate out of milk soon after mixing.

The terms and expressions which have been employed herein are used as terms of description and not limitation, and there is no intention in the use of such terms and expressions of excluding any equivalent of the steps and features described or portions thereof. It is recognized that various modifications may be made and it is intended to cover by the appended claims all such modifications falling within the true spirit and scope of this invention.

What is claimed is:

1. The process for preparing a flavored liquid dairy product which includes mixing with 8 parts by volume of milk having a butterfat content of up to about 3½% by weight, 1 part by volume of a syrup comprising the following essential ingredients, all parts of the syrup being stated by weight

| | Parts |
|---|---|
| Liquid flavoring | 1. |
| Sugar | Approximately 93. |
| Water | Approximately 133. |

2. The process of claim 1 which includes the step of drying the finished liquid to produce a powder.

3. The process of preparing a flavored dairy product which comprises, preparing a syrup by mixing 1 part by weight of liquid flavoring with approximately 93 parts by weight of sugar and approximately 133 parts by weight of water, adding 1 part by volume of the said syrup to 8 parts by volume of milk having a butterfat content of 2% by weight, and thereafter pasteurizing and homogenizing the said syrup and milk mixture.

4. The process of preparing a flavored milk drink which comprises, preparing a syrup by mixing 1 part by weight of liquid flavoring with approximately 93 parts by weight of sugar and approximately 133 parts by weight of water, sterilizing the said syrup, and thereafter adding 1 part by volume of the said syrup to 8 parts by volume of milk having a butterfat content of 2% by weight, which milk has previously been pasteurized and homogenized.

5. The process of claim 2 which includes the step of adding food coloring to the syrup prior to mixing the syrup with the milk.

6. The method for preparing flavored buttermilk which comprises processing unpasteurized skim milk to convert it into buttermilk and during such processing adding to the liquid being processes a flavoring syrup in the ratio of approximately one part by volume of syrup to approximately eight parts by volume of the liquid being processed, the said syrup comprising the following essential ingredients, all ingredients of the syrup being stated by weight:

| | Parts |
|---|---|
| Liquid flavoring | 1. |
| Sugar | Approximately 93. |
| Water | Approximately 133. |

7. The process for preparing flavored cottage cheese which comprises pasteurizing skim milk, cooling the said pasteurized milk, adding to the pasteurized milk approximately 1% by weight of cottage cheese culture, heating the resulting mixture at 120–130° F. for 2 to 3 hours to form the basic ingredient, cooling the said basic ingredient, adding to the said basic ingredient a dressing comprising a mixture of butterfat and flavoring syrup, the said dressing including from 1 to 3 parts by weight of flavoring syrup for each 16 parts by weight of the said basic ingredient, and the said syrup comprising the following essential ingredients, all parts of the syrup being stated by weight:

| | Parts |
|---|---|
| Liquid flavoring | 1. |
| Sugar | Approximately 93. |
| Water | Approximately 133. |

References Cited in the file of this patent

UNITED STATES PATENTS

| 2,834,679 | Stoloff | May 13, 1958 |
| 2,924,531 | Stewart et al. | Feb. 9, 1960 |

UNITED STATES PATENT OFFICE
CERTIFICATE OF CORRECTION

Patent No. 3,118,769                                            January 21, 1964

John W. Pletcher

It is hereby certified that error appears in the above numbered patent requiring correction and that the said Letters Patent should read as corrected below.

Column 6, line 13, for the claim reference numeral "2" read -- 1 --.

Signed and sealed this 29th day of June 1965.

(SEAL)
Attest:

ERNEST W. SWIDER                                        EDWARD J. BRENNER
Attesting Officer                                          Commissioner of Patents